(12) United States Patent
Baernklau et al.

(10) Patent No.: US 9,899,917 B2
(45) Date of Patent: Feb. 20, 2018

(54) METHOD FOR PRODUCING AN OUTPUT VOLTAGE AND ASSEMBLY FOR PERFORMING THE METHOD

(75) Inventors: Hans Baernklau, Dresden (DE);
Steffen Bernet, Radeberg (DE);
Albrecht Gensior, Dresden (DE); Jens Weber, Dresden (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 228 days.

(21) Appl. No.: 14/008,946

(22) PCT Filed: Mar. 30, 2012

(86) PCT No.: PCT/EP2012/055890
§ 371 (c)(1),
(2), (4) Date: Sep. 30, 2013

(87) PCT Pub. No.: WO2012/131073
PCT Pub. Date: Oct. 4, 2012

(65) Prior Publication Data
US 2015/0194885 A1    Jul. 9, 2015

(30) Foreign Application Priority Data

Apr. 1, 2011   (DE) .................. 10 2011 006 631

(51) Int. Cl.
*H02M 5/451*   (2006.01)
*H02M 3/158*   (2006.01)
(Continued)

(52) U.S. Cl.
CPC ........... *H02M 3/158* (2013.01); *H02M 7/483* (2013.01); *H02P 27/14* (2013.01); *H02M 5/451* (2013.01);
(Continued)

(58) Field of Classification Search
CPC .... H02M 5/451; H02M 5/452; H02M 5/4585; H02M 7/525; H02M 7/758;
(Continued)

(56) References Cited

U.S. PATENT DOCUMENTS 3,860,858 A * 1/1975 Nola .................. H02P 27/042
318/801
6,507,503 B2 * 1/2003 Norrga .................. H02M 7/758
363/17

(Continued)

FOREIGN PATENT DOCUMENTS

| EP | 1 414 145 A1 | 4/2004 | |
|---|---|---|---|
| GB | WO 2010145689 A1 * | 12/2010 | ............ H02M 7/483 |
| JP | WO 2010122651 A1 * | 10/2010 | .............. H02M 1/12 |

OTHER PUBLICATIONS

Modulares Stromrichterkonzept für Netzkupplunsanwendung bei hohen Spannungen; R. Marquardt, A. Lesnicar, J. Hildinger, ETG-Tagung 2002; 2002.

(Continued)

*Primary Examiner* — Timothy J Dole
*Assistant Examiner* — Bryan R Perez
(74) *Attorney, Agent, or Firm* — Henry M. Feiereisen LLC

(57) ABSTRACT

In a method for generating with a modular multilevel power converter (M2C) having a plurality of sub-modules a frequency-variable output voltage, the sub-modules are switched on and off to generate from an input voltage discrete voltage steps approximating an approximately sinusoidal alternating output voltage having a first angular frequency located between a zero frequency and a second angular frequency, and the input voltage is controlled or regulated as a function of the first angular frequency so as to be located between a lower angular frequency, which is equal to or greater than the zero frequency, and a third (Continued)

angular frequency, such that the input voltage increases with increasing first angular frequency, thereby reducing capacitor complexity in the power converter.

15 Claims, 5 Drawing Sheets

(51) Int. Cl.
   *H02M 7/483* (2007.01)
   *H02P 27/14* (2006.01)
   *H02M 1/00* (2006.01)
(52) U.S. Cl.
   CPC ............ *H02M 2001/0003* (2013.01); *H02M 2007/4835* (2013.01)
(58) Field of Classification Search
   CPC ......... H02M 2007/4835; H02M 7/483; H02M 7/49; H02M 7/487
   USPC .......... 363/131, 132, 34–37, 97–98, 134–137
   See application file for complete search history.

(56) References Cited

U.S. PATENT DOCUMENTS

| | | | | |
|---|---|---|---|---|
| 6,519,169 | B1* | 2/2003 | Asplund | H02M 7/48 363/132 |
| 7,064,967 | B2* | 6/2006 | Ichinose | H01M 8/04559 363/56.01 |
| 2001/0017237 | A1* | 8/2001 | Tominaga | B66B 1/30 187/290 |
| 2002/0110006 | A1* | 8/2002 | Mao | H02M 3/33569 363/21.06 |
| 2002/0175644 | A1 | 11/2002 | Su | |
| 2004/0165868 | A1 | 8/2004 | Sato et al. | |
| 2005/0184713 | A1* | 8/2005 | Xu | H02M 3/156 323/282 |
| 2007/0223258 | A1* | 9/2007 | Lai | H02M 5/293 363/37 |
| 2009/0021081 | A1* | 1/2009 | Jacobson et al. | 307/77 |
| 2009/0128117 | A1* | 5/2009 | Ochiai | B60L 11/1851 323/299 |
| 2009/0196078 | A1* | 8/2009 | Gruber | H02M 7/483 363/36 |
| 2010/0067266 | A1* | 3/2010 | Dommaschk | H02M 7/483 363/64 |
| 2012/0001586 | A1* | 1/2012 | Maruyama | H02M 5/4585 318/798 |

OTHER PUBLICATIONS

New Concept for High Voltage—Modular Multilevel Converter; R. Marquardt, A. Lesnicar Proc. of IEEE-Power Electronics Specialists Conference (PESC), Aachen 2004; DE.

High-Power Converters and AC Drives; Bin Wu High-Power Converters and AC Drives IEEE Press A John Wiley & Sons, Inc., Publication, 2006 p. 1-333 Introduction + Chapter 6, 7, 8, 9, 12 and 14; 2006.

Korn A. J. et al; "Low Output Frequency Operation of the Modular Multi-Level Converter"; Energy Conversion Congress and Exposition (ECCE), 2010 IEEE, Piscataway, NJ; pp. 3993-3997; ISBN: 978-1-4244-5286-6; XP031787020; 2010; US; Sep. 12, 2010.

International Search Report issued by the European Patent Office in International Application PCT/EP2012/055890.

* cited by examiner (a) Variable voltage  $U_d = f_{(\omega_0)}$ (b) $U/f$- Control : $\hat{U}_{LN} = f_{(\omega_0)}$

METHOD FOR PRODUCING AN OUTPUT VOLTAGE AND ASSEMBLY FOR PERFORMING THE METHOD

CROSS-REFERENCES TO RELATED APPLICATIONS

This application is the U.S. National Stage of International Application No. PCT/EP2012/055890, filed Mar. 30, 2012, which designated the United States and has been published as International Publication No. WO 2012/131073 and which claims the priority of German Patent Application, Serial No. 10 2011 006 631.4, filed Apr. 1, 2011, pursuant to 35 U.S.C. 119(a)-(d).

BACKGROUND OF THE INVENTION

The invention relates to a method for the generation of a frequency-variable output voltage $u_a$ by means of a modular multilevel power converter (M2C), wherein through the switching on and off of sub-modules, the power converter generates a sinusoidal alternating voltage, approximated by discrete voltage levels, with a first angular frequency $\omega_0$, which lies between a zero frequency $\omega_{0,min}$ and a second angular frequency $\omega_{0,\,max}$, from an input voltage $U_d$.

The invention also relates to an arrangement for performing the method for the generation of a frequency-variable output voltage $u_a$ from an input voltage $U_d$ by means of a modular multilevel power converter (M2C), with which branches are arranged for the generation of an output voltage, each comprising a series connection of a number of sub-modules.

Multilevel power converters can generate voltages at their output terminals with a low harmonic distortion, which come very close to a desired sinusoidal curve of the voltage.

At present, many multilevel topologies are disclosed, such as 3-level NPC, Flying Capacitor Converters, Cascaded H-Bridge Converters, as in Bin Wu, "High-Power Converters and AC Drives", John Wiley & Sons Inc., Hoboken, N.J., USA, 2006.

A relatively new topology is the modular multilevel power converter (M2C, M²LC), as described in R. Marquardt, A. Lesnicar, J. Hildinger, "Modulares Stromrichterkonzept für Netzkupplungsanwendung bei hohen Spannungen" ["Modular power converter concept for use in network coupling at high voltages"], ETG-Fachtagung [specialist conference], Bad Nauheim, 2002 and in R. Marquardt, A. Lesnicar, "New Concept for High Voltage Modular Multilevel Converter", Proc. Of IEEE Power Electronics Specialists Conference (PESC), Aachen, 2004.

This is at present the subject matter of application and research. An essential feature of the M2C is the series connection of many cells, the so-called sub-modules.

It is necessary for the mode of operation for each of these cells to have an energy storage device, which can take the form of a direct voltage capacitor.

During the operation of multilevel power converters according to the prior art the following conditions should be observed:

Since the energy storage devices are not charged or discharged by external wiring networks, such as galvanically isolated rectifiers, the change over time of the stored energy is heavily dependent on the operation of the converter and/or the load. Thus according to [R. Marquardt, . . . "Modulares Stromrichterkonzept für Netzkupplungsanwendung bei hohen Spannungen" (Modular power converter concept for use in network coupling at high voltages)] the design-relevant energy fluctuation during so-called "circulating-current-free operation" depends indirectly proportionally on the fundamental frequency of the load current.

With circulating currents, current components are named here in the branches of the converter which flow neither via the connection to the DC intermediate circuit, nor via the load. The "circulating-current-free" operation thus indicates that the currents in the branches of the converter only contain components which flow via the DC intermediate circuit and the load.

According to this, a "circulating-current-free operation" at "low" fundamental frequencies is either not possible or only possible with restrictions. This should be noted, in particular, with respect to the operation of electrical machines.

In particular, in the case of motor or generator applications, a very fast startup of the machine to the design frequency $f_N$ has to be achieved in order to restrict the energy input into the sub-module capacitors. Consequently other restrictions to the scope of application are incurred on the basis of the properties of the driven mechanical system.

Restriction of the operating frequency $f_0$ of the converter to $f_{0,\,Min} < f_0 < f_{0,\,Max}$. With machine applications this implies a "hard" startup of the machine from the idling state.

One possibility of achieving the fast startup is to limit the operating frequency of the converter to $0 < f_{0,Min} < f_0 <= f_{0,\,Max}$. In particular, this indicates in the case of asynchronous machines a "hard" startup from the idling state to:

$$f_{Mech} = \frac{f_{0,Min}}{p} * (1 - s_x)$$

where p is the number of pole pairs, $f_{Mech}$ is the mechanical speed of the machine and $s_x$ is the slip.

Therefore no stationary operation is possible at frequencies $f_0 < f_{0,Min}$, thus no direct current brakes and no soft start are possible from an idling state. It must be noted that a downstream mechanical system is not damaged as a result of the possible occurrence of torque impulses.

A further option to reduce the energy fluctuations is to match the amplitude of the load current as a function of the frequency $f_0$, $\hat{I}_L = g(f_0)$, with the aim of restricting the energy input in the sub-module capacitors. This leads to a reduction in the power of the M2C; in the case of drives this corresponds to a reduction in the torque. In the case of network applications this corresponds to a reduction in the power to be transferred.

Further, the influence of the energy input into the sub-module capacitors due to additional current components in the converter, which do not flow via the DC connection, or the load, must be taken into account. Frequently the consequences of this influence are additional switching and conduction losses in the semiconductor devices, additional losses within the converter at the ohmic resistances, increase in the silicon surface of the semiconductor devices, as well as a reduction in the efficiency.

An influencing of the energy input into the capacitors of the sub-modules through a variation of the difference from the sum of the terminal voltage of the sub-modules above the connection terminals of the load or of the mains and the sum of the terminal voltage of the sub-modules below. This variation corresponds to a modulation of the common mode voltage This measure is not possible on all systems. If possible, the modulation of the medium voltage level control is often restricted by the technical requirements of the application. Examples of this are insulation requirements. The modulation of the medium voltage level control of the sub-modules leads to a change in the switching losses.

An operation of the power converter according to [Korn, Winkelnkemper, "Low output frequency ..."] is also possible with $f_0 \ll f_N$ by suitably combining the influencing of the energy input by circulating currents and varying the common mode voltage. In particular, an operation with $f_a)=0$ Hz is possible with the cited method.

Explanation of this are found in A. J. Korn, M. Winkelnkemper, and P. Steimer, "Low output frequency operation of the modular multi-level converter", in Energy Conversion Congress and Exposition (ECCE), 2010 IEEE, September 2010, pp. 3993, 3997.

A further possibility is also the layout of the sub-module capacitors on a minimal continuous operation frequency $f_{0, Min}$. An over-dimensioning with respect to the nominal frequency $f_N$, increases the costs. Also, the additional stored energy in the converter increases the cost required to satisfy the safety requirements.

In summary the following applies:

The operation of a modular multilevel power converter (M2C) for $f_0 < f_N$ at the rated current of the converter leads to increasing expense in terms of capacitors and/or power semiconductors and/or additional requirements of the load, for example relating to the insulation of the neutral point of a machine.

The operation for $f_0 < f_N$ at a reduced current clearly restricts the characteristics of the converter, such that possible areas of application are drastically reduced. Thus, for example, a 4-quadrant drive, in which $M=M_N$ is required for the torque of the machine over the whole range, is not possible.

SUMMARY OF THE INVENTION

Thus the object underlying the invention is to provide a method for the generation of an output voltage and an arrangement for performing the method, with which the capacitor and semiconductor demands and the associated costs can be reduced at a given load current and a simplification of the demands in respect of control and regulation for the operating range of $\omega_1 < \omega_0 < \omega_2$ and a reduction of the losses in the power converter can be achieved.

Furthermore there is a requirement for the development of additional areas of application of the converter, for example for a continuous operation at low frequencies or the operation of an electrical machine with a constant torque over a wide speed range without the above named measures.

According to the invention the object involved in a method of the type named in the introduction is achieved by the input voltage $U_d$ being controlled or regulated in such a way, as a function of the angular frequency $\omega_0$ in the range between an angular frequency $\omega_1$ which is equal to or greater than the zero frequency $\omega_0$, and an angular frequency $\omega_2$, for the reduction of the expense of a capacitor in the power converter, that it increases with an increasing frequency.

Here $\omega=2\pi f$, in particular $\omega_0=2\pi f_0$.

Thereby the angular frequency $\omega_0$, which depicts the fundamental frequency, or operating frequency of the power converter, lies in the range between the lower limit of the frequency range $\omega_{0,min}$ and the second angular frequency $\omega_{0,max}$, which marks the upper boundary of the frequency range.

The value of the angular frequency is considered.

The minimum frequency $\omega_{0, min}$ thus represents the lowest achievable frequency during the operation of the power converter and is greater than or equal to 0.

$$0 \leq \omega_{0,min} \leq \omega_0 \leq \omega_{0,max}$$

During the control or regulation of the DC voltage $U_d$ at the connection point of the converter as a function of the fundamental frequency of oscillation $\omega_0$, this control or regulation takes place between the lower minimum frequency $\omega_1$ and the second angular frequency $\omega_2$.

$$\omega_1 \leq \omega_0 \leq \omega_2$$

According to the invention, a variation in the DC voltage $U_d$ is provided on the DC voltage intermediate circuit as a function of the fundamental angular frequency $\omega_0$ or of the fundamental frequency $f_0$ of the power converter with due consideration of the load current amplitude $\hat{I}_L$ and/or of the terminal voltage. According to the invention the energy input into the sub-module capacitors of the M2C is influenced by this variation in the DC voltage $U_d$.

An additional modulation of the common mode voltage and an energy shift due to additional current components are optionally possible. The variation in the DC voltage $U_d$ in the intermediate circuit conditionally provides a connection, which can provide a variable voltage $U_d$. A selection of such connections is given in the exemplary embodiment below.

The invention also relates to a method for the generation of a voltage $U_d$ in the DC intermediate circuit from a frequency-variable input voltage $u_a$ by means of the modular multilevel power converter (M2C).

In an embodiment of the invention it is provided that the at least one sub-module is switched on and off in stages.

In another embodiment of the invention it is provided that the switching on and off of at least one sub-module is controlled by PWM (Pulse Width Modulation).

One form of control of the sub-modules consists in one or more modules being triggered by means of a PWM control signal (Pulse Width Modulation).

In a further embodiment of the invention, it is provided that the voltage $U_d$ increases monotonously as a function of the angular frequency $\omega_0$.

In a special embodiment of the invention, it is provided that the voltage $U_d$ increases linearly at least in one interval as a function of the angular frequency $\omega_0$.

In an embodiment of the invention, it is provided that the input voltage $U_d$ increases non-linearly at least in one interval as a function of the angular frequency $\omega_0$.

In accordance with the invention, the voltage curve of the voltage $U_d$ can increase monotonously as a function of the angular frequency $\omega_0$. Thus there is no obligatory linear dependency between $U_d$ and $\omega_0$; the voltage $U_d$ either retains its value as a function of $\omega_0$ or becomes greater in value.

However, the voltage curve may also display a linear increase, at least over a considered interval.

In another variation of the invention, it is provided that the input voltage $U_d$ is controlled or regulated with additional dependency on a load current and/or a terminal voltage or load voltage of the M2C and/or a torque of a machine controlled with the output voltage $u_a$.

In addition to the dependency of the input voltage $U_d$ on the angular frequency, other dependencies are possible, for example on a load current or a terminal voltage of a machine that is to be controlled. There is also the possibility of considering a required torque of the machine during the generation of the voltage $U_d$.

In one variant of the invention, it is provided that the input voltage $U_d$ is controlled or regulated in an additional dependency on a modulation of the common mode voltage of the load.

In another version of the invention, it is provided that the input voltage $U_d$ is controlled in additional dependency on an energy shift between energy storage devices of the power converter through additional current components in the branch currents of the power converter.

The voltage in the DC intermediate circuit $U_d$ is also designated as an input voltage.

According to the invention, the object of an arrangement of the type named in the introduction is achieved by providing input-side means for the variation of the input voltage $U_d$ upstream of the power converter in order to reduce capacitor costs in the power converter.

This variation in the input voltage $U_d$ can be accommodated, in that one or more means for the variation of the input or DC intermediate circuit voltage $U_d$ is/are provided upstream on the input side of the power.

In an embodiment of the invention it is provided that the means for the variation of the input voltage $U_d$ exists in the form of an adjustable transformer and a rectifier.

One of the simplest forms is the use of diode rectifiers. Another possibility is the use of two M2Cs or another power converter with an intermittent voltage circuit or power converter with intermediate current circuit. These function as rectifiers or inverters.

In another embodiment it is provided that the means for the variation of the input voltage $U_d$ consists of a power converter with intermediate current circuit.

In a special embodiment of the invention it is provided that the means for variation of the input voltage $U_d$ comprises a mains-side power converter and a DC/DC converter.

In one development of the invention it is provided that the means for the variation of the input voltage $U_d$ comprises a power converter with intermediate voltage circuit.

In another embodiment it is provided that the power converter with intermediate voltage circuit comprises a 2-level converter, 3-level NPC, 3-level flying capacitor or arbitrary mulilevel flying capacitor voltage source converter or an active neutral point clamped multilevel converter.

The following provides information on literature describing the prior art:

Bin Wu, "High-power Converters and AC Drives", John Wiley & Sons Inc., Hoboken, N.J., USA, 2006

M. Hagiwara, H. Akagi, "PWM control and experiment of modular multilevel converters", Power Electronics Specialists Conference (PESC) 2008, PESC 2008, IEEE, page 154-161

R. Marquadt, A, Lesnicar, J. Hildinger, "Modulares Stromrichterkonzept für Netzkupplungsanwendung bei hohen Spannungen" [Modular power converter concept for use in network coupling at high voltages], ETG-Fachtagung [specialist conference], Bad Nauheim, 2002

R. Marquadt, A. Lesnicar, "New Concept for High Voltage-Modular Multilevel Converter", Proc. Of IEEE Power Electronics Specialists Conference (PESC), Aachen, 2004

A. J Korn, M Winkelnkemper, and P. Steimer, "Low output frequency operation of the modular multi-level converter", in Energy Conversion Congress and Exposition (ECCE), 2010 IEEE, September 2010, pp. 3993-3997.

BRIEF DESCRIPTION OF THE DRAWING

The invention will now be described in greater detail in the following on the basis of an exemplary embodiment. The related drawings show the following.

DETAILED DESCRIPTION OF PREFERRED EMBODIMENTS

For the M2C, various regulation and control methods are known, such as that described, for example, in M. Hagiwara, H. Akagi, "PWM control and experiment of modular multilevel converters", Power Electronics Specialists Conference (PESC) 2008, PESC 2008, IEEE, pages 154-161, which have an effect on the energy fluctuations in the sub-module capacitors. In addition to the implemented control and regulation methods, the operating mode of the power converter has also a decisive impact on the energy fluctuation. For this reason the essential dependencies of the energy fluctuations are described by way of example for a method, and the influence of the voltage $U_d$ is also shown.

Figure 1:
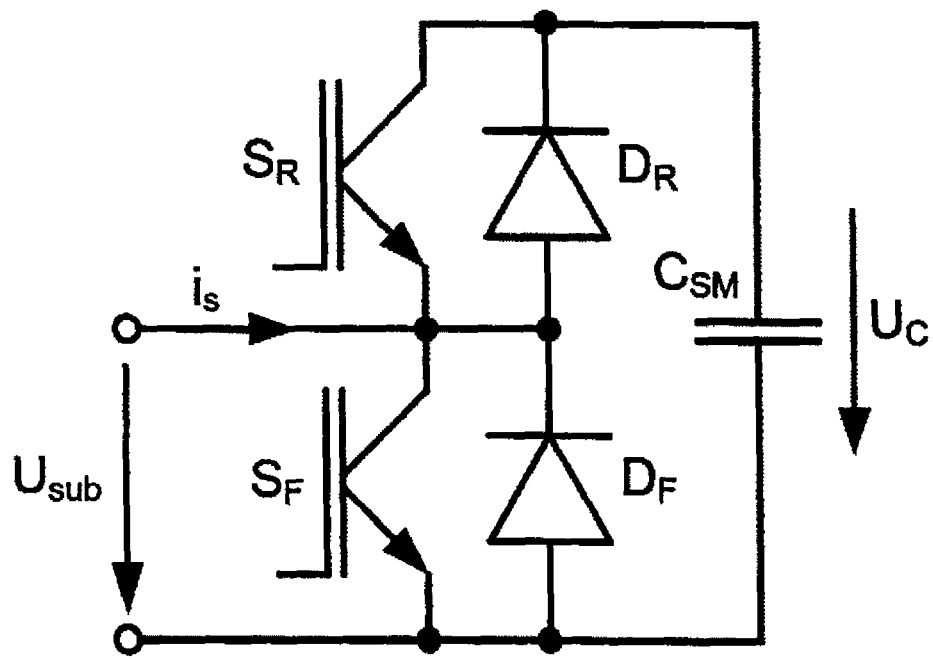
FIG. 1 a circuitry implementation of a sub-module of an M2C based on the prior art.

The structure of a cell arranged in series connection or of a so-called sub-module of an M2C is shown in FIG. 1, wherein other circuitry variants are also possible.

Figure 2:
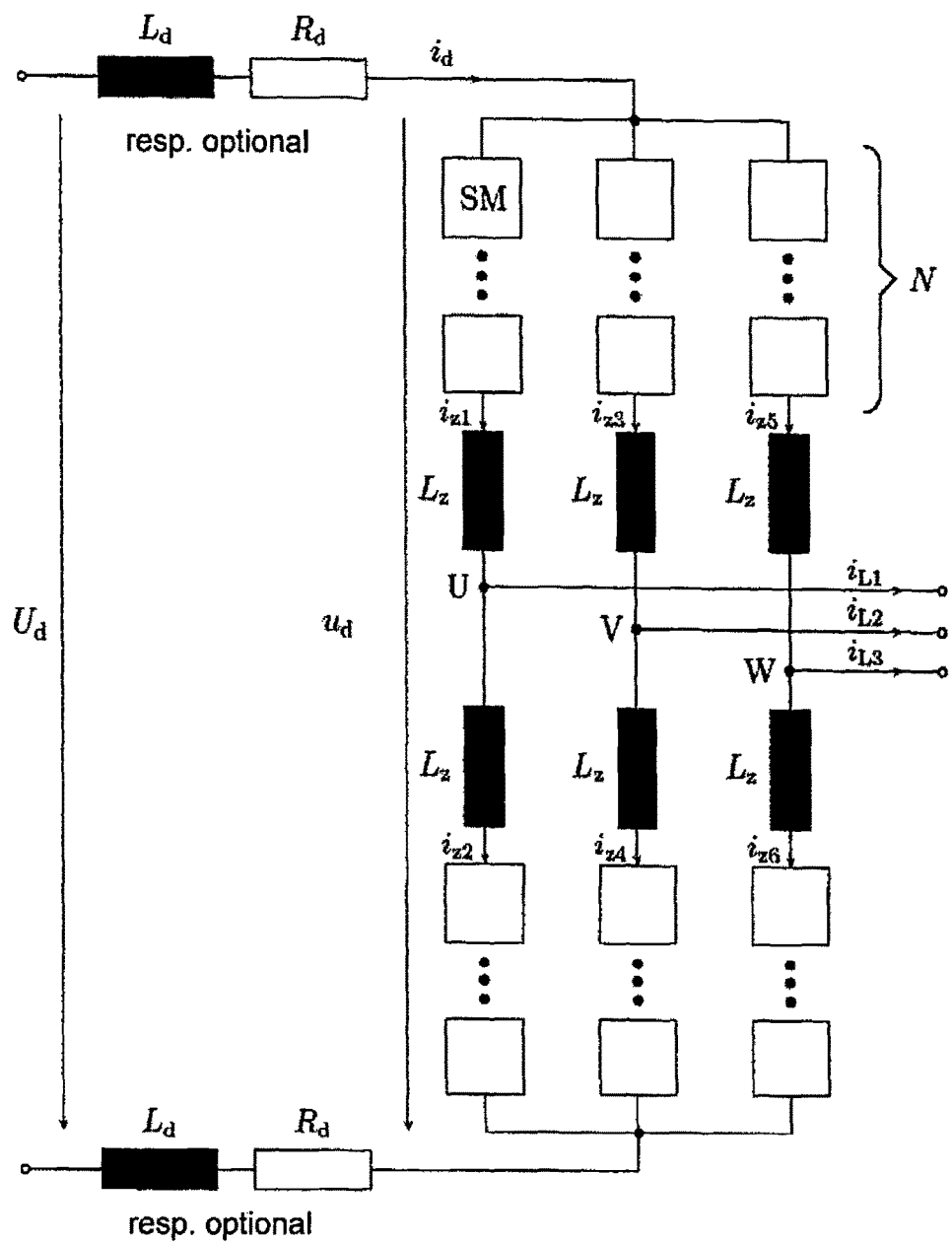
FIG. 2 a possible circuit construction of the M2C with N sub-modules per branch, based on the prior art.

FIG. 2 shows the circuit construction of an M2C, for example for the creation of a 3-phase voltage system on the terminals U, V, W. However, the statements also apply for an arbitrary number of phases m, m$\in$\{1, 2, 3, . . . \}. The arm reactors Lz are important for the mode of operation, in order to avoid power compensation of the sub-modules of the converter at the moment of the switching of a cell. By this means the arm reactors can be magnetically coupled in a phase (U, V, W). Any resistors involved are not indicated in FIG. 2. The voltage $U_d$ is provided, for example, by a mains-side power converter (passive-front-end (PFE) or active-front-end (AFE)) and can be smoothed by means of capacitors in the direct voltage intermediate circuit.

Known combinations of the M2C are:

M2C with diode bridge (PFE)

M2C with M2C (AFE)

M2C with 3L-NPC-VSC as AFE.

Other variations are also possible. The following characteristics are particularly advantageous for the switching of the M2C:

High availability through redundancy
Strong modular construction
Low harmonic output voltage; quality of the output voltage can be increased by the number of sub-modules
Simple adaptation to various power and voltage levels
Containment of short-term mains supply failures
Sure start from zero-voltage state ("black start")
Network applications: Island mode operation possible
Network applications: Minimal or zero filter requirement
Machine applications: Arbitrary machine types (asynchronous/synchronous, . . . ) possible
Operation with standard motors, without filter
DC bus configurations possible
Standard transformer or transformerless operation possible.

The essential disadvantages of the circuit are summarized as follows:

High expense in terms of capacitive energy storage
High expense in terms of control and/or regulation
Dependency of the energy fluctuation in the energy storage devices of load current and fundamental frequency f0 of the load, and also the operating mode of the power converter
With low output frequencies
  Increased expense on capacitors
  Possible increased neutral point voltage
  Possible additional current components in the branch current (increased losses)
  Considerable distortion of the output voltage.

A known disadvantage from the prior art with so-called circulating-current-free operation exists, in that with the M2C the energy fluctuation in the capacitors of the sub-modules is dependent on the amplitude $\hat{I}_L$ and the fundamental frequency $f_0$ of the load current.

Thus without suitable additional measures, with $\hat{I}_L$=constant, $U_d$=constant in the case of a reduction in the fundamental frequency $f_0$, an increase in the energy fluctuation in the sub-module capacitors is to be expected.

This technical problem is solved by the invention.

In the following very simplified considerations are examined on the M2C. These are inadequate to describe the real operating behavior, but they are adequate for the core of the disclosure of the invention. The aim of the embodiments is to show the influence of the variable voltage $U_d$ taking the example of an operating mode.

At the outset a symmetrical structure of the converter is considered. Related components such as arm reactors $L_z$ and sub-modules (SM) have identical parameters. The structure of the converter with N sub-modules per branch is shown in FIG. 2. In the model used the arm reactors in a phase are not magnetically coupled. The lines of argument relating to the energy fluctuations on an M2C with magnetically coupled arm reactors are similar and are therefore not separately specified.

In the literature, various methods are known for the regulation of an M2C. For this description no reference is made to these. Simple physical considerations are sufficient for the stationary operation. These relate merely to the fundamental oscillation. An influencing of the common mode voltage through modulation of the sub-modules does not take place. Further, no additional branch current components are noted. Furthermore, the voltage drops on the arm reactors $L_z$ are neglected.

The stationary symmetrical operation is considered as the operating mode. This is characterized in that all 6 branches have to achieve similar sum voltages of the modules, which are, however, offset in time. During symmetrical operation of the converter the upper and lower modules of a phase must respectively provide the time-averaged voltage $$u_{dSM} = \frac{u_d}{2N} \qquad 1$$

at the terminals. For the generation of a rotating field at the terminals U, V, W a sinusoidal modulation of the form $$u_{SinSM} = \pm \frac{\hat{U}_{LN}}{N} \sin(\omega_0 t + \varphi x) \qquad 2$$

is also required. Thus it follows that the voltages to be achieved at the terminals of the sub-modules are as follows:

$$u_{K1,1} = \frac{1}{N}\left(\frac{u_d}{2} - \hat{U}_{LN}\sin(\omega_0 t + \varphi_u)\right) \qquad \text{3 to 8}$$

$$u_{K1,2} = \frac{1}{N}\left(\frac{u_d}{2} + \hat{U}_{LN}\sin(\omega_0 t + \varphi_u)\right)$$

$$u_{K1,3} = \frac{1}{N}\left(\frac{u_d}{2} - \hat{U}_{LN}\sin\left(\omega_0 t + \varphi_u - \frac{2}{3}\pi\right)\right)$$

$$u_{K1,4} = \frac{1}{N}\left(\frac{u_d}{2} + \hat{U}_{LN}\sin\left(\omega_0 t + \varphi_u - \frac{2}{3}\pi\right)\right)$$

$$u_{K1,5} = \frac{1}{N}\left(\frac{u_d}{2} - \hat{U}_{LN}\sin\left(\omega_0 t + \varphi_u + \frac{2}{3}\pi\right)\right)$$

$$u_{K1,6} = \frac{1}{N}\left(\frac{u_d}{2} + \hat{U}_{LN}\sin\left(\omega_0 t + \varphi_u + \frac{2}{3}\pi\right)\right)$$

wherein voltage drops at the arm reactors and any resistances present are neglected.

A load at the terminals U, V, W is taken into account, which draws the following sinusoidal currents:

$$i_{L1} = \hat{I}_L \sin(\omega_0 t + \varphi_{iL}) \qquad 9$$

$$i_{L2} = \hat{I}_L \sin\left(\omega_0 t + \varphi_{iL} - \frac{2}{3}\pi\right)$$

$$i_{L3} = \hat{I}_L \sin\left(\omega_0 t + \varphi_{iL} + \frac{2}{3}\pi\right)$$

The apportionment of the load currents to the branches 1 to 6 is assumed to be uniform. Thus for the currents in the branches it follows that:

$$i_{z1} = \frac{1}{3}i_d + \frac{1}{2}i_{L1} \qquad \text{10 to 15}$$

$$i_{z2} = \frac{1}{3}i_d - \frac{1}{2}i_{L1}$$

$$i_{z3} = \frac{1}{3}i_d + \frac{1}{2}i_{L2}$$

$$i_{z4} = \frac{1}{3}i_d - \frac{1}{2}i_{L2}$$

-continued $$i_{z5} = \frac{1}{3}i_d + \frac{1}{2}i_{L3}$$

$$i_{z6} = \frac{1}{3}i_d - \frac{1}{2}i_{L3}$$

wherein $i_d$ is the current at the DC terminal. On the basis of the stationary operation, $$\frac{di_d}{dt} = 0,$$

thus for the voltage drop across the reactors $L_d$ it follows that $u_{Ld}=0$.

Also in the case of practical applications the voltage drop at the resistances $R_d$ can frequently be neglected, so that in the following it can be taken that $u_d=U_d$.

In the time-averaged mean at each of the j sub-modules of a branch, the i, ($i \in \{1, 2, \ldots, 6\}$, $j \in \{1, 2, \ldots, N\}$) power $$p_{SM,ij} = u_{Kl,ij} i_{SM,i} = u_{Kl,ij} i_{zi} \quad 16$$

is converted. The following considerations relate to modules of the branch 1; however they similarly apply to the modules of the remaining branches 2 and 3. The following power values are converted on the modules of the branch 1:

$$p_{SM,1j} = \frac{1}{N}\begin{pmatrix} \frac{1}{6}U_d i_d - \frac{1}{4}\hat{U}_{LN}\hat{I}_L\cos(\varphi_U - \varphi_{iL}) - \\ \frac{1}{3}\hat{U}_{LN}i_d\sin(\omega_0 t + \varphi_U) + \\ \frac{1}{4}U_d\hat{I}_L\sin(\omega_0 t + \varphi_{iL}) + \\ \frac{1}{4}\hat{U}_{LN}\hat{I}_L\cos(2\omega_0 t + \varphi_U + \varphi_{iL}) \end{pmatrix}, \ldots \quad 17$$

In order for the energy to remain constant over a period in the energy store of the sub-module, the following must apply:

$$i_d = \frac{3}{2}\frac{\hat{U}_{LN}}{U_d}\hat{I}_L\cos(\varphi_U - \varphi_{iL}) \quad 18$$

With this condition equation 17 becomes:

$$p_{SM,1j} = \frac{\hat{I}_L}{4N}\begin{pmatrix} -2\frac{\hat{U}_{LN}^2}{U_d}\cos(\varphi_U - \varphi_{iL})\sin(\omega_0 t + \varphi_U) + \\ U_d\sin(\omega_0 t + \varphi_{iL}) + \hat{U}_{LN}\cos(2\omega_0 t + \varphi_U + \varphi_{iL}) \end{pmatrix} \quad 19$$

In order to further simplify the discussion, on the assumption of an inductive load, i.e.

$$\varphi_U = \varphi_{iL} + \frac{\pi}{2},$$

the following conclusions can be drawn and also relate to general load cases.

The current direction $\varphi_u$ is fixed as $\varphi_u=0$. It then follows from equation 19, that:

$$p_{SM,1j} = \frac{\hat{I}_L}{4N}(U_d\sin(\omega_0 t) - \hat{U}_{LN}\sin(2\omega_0 t)) \quad 20$$

The relationship describes the periodic energy input into a sub-module. This is directly proportional to the load current $\hat{I}_L$ and leads to a periodic change in the energy content in the energy storage device of the sub-module. The energy content can be determined by integration of equation 20, $$W_{SM,1j} = -\frac{U_d\hat{I}_L}{4N\omega_0}\left(\cos(\omega_0 t) - \frac{1}{2}\frac{\hat{U}_{LN}}{U_d}\cos(2\omega_0 t)\right) + W_{ij0} \quad 21$$

with the, on average, stored energy $W_{ij0}$ on the stationary work regime. The time-dependent portion of the energy content is directly proportional to the load current and indirectly proportional to the angular frequency $\omega_0$.

In the special case $$\hat{U}_{LN} \ll \frac{U_d}{2}$$

equation 21 can be simplified to $$W_{SM,1j} \approx -\frac{U_d\hat{I}_L}{4N\omega_0}\cos(\omega_0 t) + W_{ij0} \quad 22$$

In this case the amplitude of the energy change is directly proportional to the voltage $U_d$; this provides a strong impetus for the voltage $U_d$ not to be constant, but rather variable. In this way $U_d$ cannot be varied arbitrarily.

Due to the structure of the MC2 the maximum achievable line-to-neutral voltage without influence of the common mode voltage is restricted by modulation to:

$$0 \le |\hat{U}_{LN}| \le \frac{1}{2}U_d \quad 23$$

This equation can also be otherwise interpreted. With the required voltage $\hat{U}_{LN}$ the following must apply:

$$U_d \ge 2\hat{U}_{LN} \quad 24$$

It remains to be established that, through variation of the voltage $U_d$ the energy fluctuation in the energy stores can be suitably influenced. In addition to the reduction in the current $\hat{I}_L$ this also represents a further possibility to limit the energy fluctuation in the energy stores with variable angular frequency $\omega_0$. However, in particular in the case of machine applications the reduction of the current $\hat{I}_L$ on the basis of the thus reduced torque is mostly only possible with restrictions.

According to the invention, the voltage $U_d$ is variable in accordance with $U_d=U_d(\omega_0)$. By suitable selection of $U_d(\omega_0)$ the energy fluctuation in the modules in the application can be appropriately influenced.

Figure 3A:
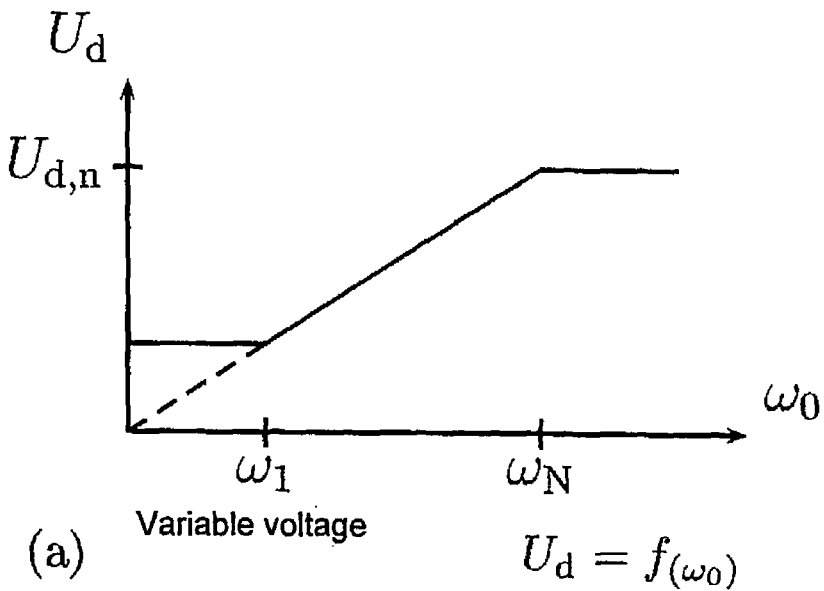
FIG. 3a a representation of the dependency in principle of the voltage $U_d$ on $\omega_0$ FIG. 3b a representation of the dependency in principle of the voltage $\hat{U}_{LN}$ on $\omega_0$ FIG. 4 a circuitry example of the variation of the voltage $U_d$. (Load: Motor/Generator (Asynchronous machine, synchronous machine, . . . )/3-phase supply)—Circuitry combination of (poss. stepped) adjustable transformer, diode rectifier and M2C, FIG. 5 a further circuitry example of the variation of the voltage $U_d$ with a circuit combination of CSR (current-source-rectifier) and M2C, FIG. 6 a third circuitry example of the variation of the voltage $U_d$ with a circuit combination comprising a mains-side power converter NSR, a DC/DC converter and an MC2 and FIG. 7 a schematic representation of the output voltage of the converter (line-to-neutral voltage) as a function of the voltage $U_d$; no PWM modulation of the sub-modules takes place.

As an approach, a linear dependency of the DC voltage on the angular frequency $\omega_0$ $$U_d(\omega_0) = U_{d,n}\frac{\omega_0}{\omega_N} \qquad 25$$

is considered, wherein other approaches are also possible. This linear relationship cannot be achieved in practice for arbitrary angular frequencies $\omega_0$, so that as a range of validity, for $$\omega_2 = \omega_N \, \omega_1 < \omega_0 < \omega_2 \qquad 26$$

must be considered. The dependencies are sketched in FIG. 3a. A motor is considered as a load on the terminals U, V and W. In order to simplify the considerations, it is assumed that the machine is U/f controlled. The dependency of the line-to-neutral voltage can be approximately described with $$\hat{U}_{LN}(\omega_0) = \hat{U}_{LN,n}\frac{\omega_0}{\omega_N} \qquad 27$$

Figure 3B:
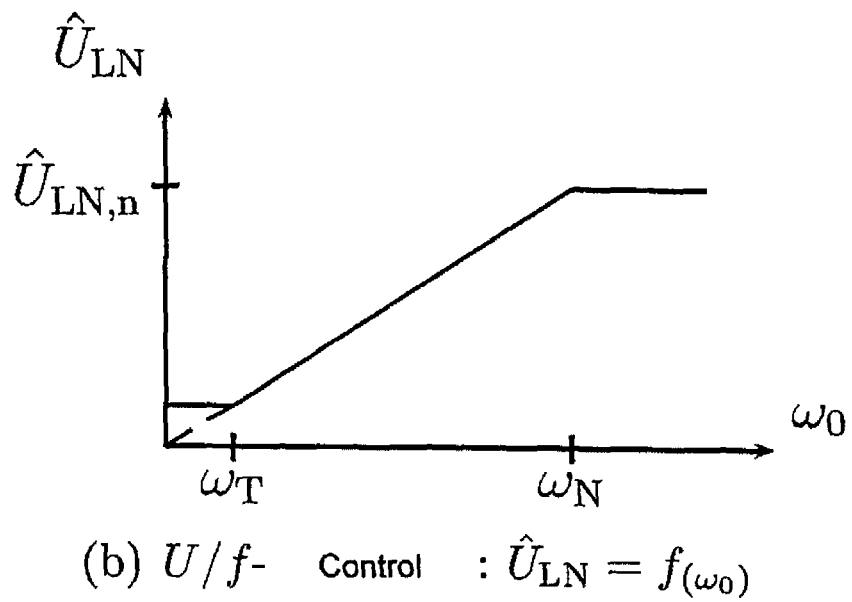

The curve is sketched in FIG. 3b. In order to determine the energy fluctuation in the energy storage devices of the sub-modules of the branch 1 integration of equation 19 is required.

$$w_{SM,1j} = \frac{U_d \hat{I}_L}{4N\omega_0}\begin{pmatrix} -\cos(\omega_0 t + \varphi_{iL}) + \\ \frac{1}{4}\hat{u}_{LN}\sin(2\omega_0 t + \varphi_U + \varphi_{iL}) + \\ \frac{1}{2}\hat{u}_{LN}^2\cos(\varphi_U - \varphi_{iL})\cos(\omega_0 t + \varphi_U) \end{pmatrix} + W_{ij0}, \qquad 28$$

wherein the amplitude $\hat{U}_{LN}$ is expressed by the reference value $\hat{u}_{LN}$ $$\hat{u}_{LN} = 2\frac{\hat{U}_{LN}}{U_d} \qquad 29$$

Insertion of equations 25 and 27 in equation 28 yields:

$$w_{SM,1j} = \frac{U_{dn}\hat{I}_L}{4N\omega_N}\begin{pmatrix} -\cos(\omega_0 t + \varphi_{iL}) + \\ \frac{1}{4}\hat{u}_{LN,n}\sin(2\omega_0 t + \varphi_U + \varphi_{iL}) + \\ \frac{1}{2}\hat{u}_{LN,n}^2\cos(\varphi_U - \varphi_{iL})\cos(\omega_0 t + \varphi_U) \end{pmatrix} + W_{ij0}, \qquad 30$$

with $$\hat{u}_{LN,n} = 2\frac{\hat{U}_{LN,n}}{U_{d,n}}.$$

From this, it follows that the amplitude of the energy fluctuation in the sub-modules for angular frequencies $\omega_0$ $$\omega_1 < \omega_0 < \omega_2$$

with $\hat{I}_L$, $\varphi_u$, $\varphi_{iL}$ being equally constant irrespective of the angular frequency $\omega_0$.

In the following, circuitry examples for the variation of the voltage $U_d$ are presented. In the foregoing considerations the effect of a variable voltage $U_d$ has been described. In the FIGS. 4, 5 and 6 examples of several circuitry principles are sketched, which facilitate a variable voltage $U_d$. No claim is made to completeness here. A discussion of the advantages/disadvantages of the options is not undertaken here.

Figure 4:
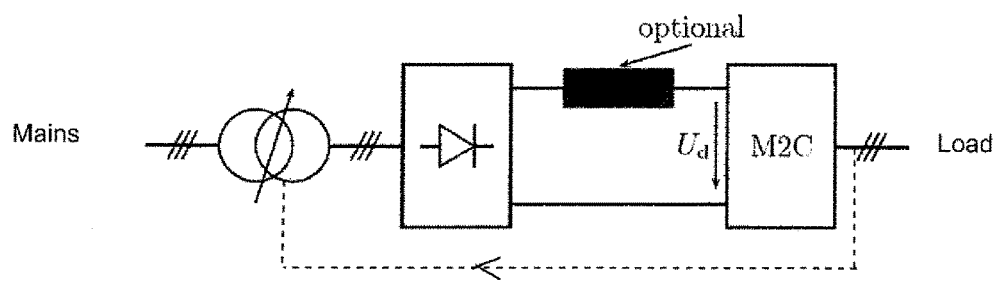

If the voltage $U_d$ is provided via a diode rectifier, then a variable voltage $U_d$ can be obtained by changing the input voltage of the rectifier. This is represented in FIG. 4.

Figure 5:
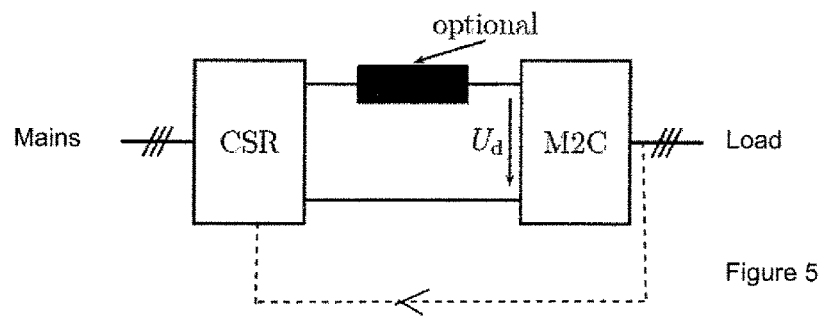

A circuitry example for the variation of the voltage $U_d$, which also can be operated without a transformer, is shown in FIG. 5. The variable voltage $U_d$ is in this case provided via a current-source-rectifier (CSR) with semiconductors which can be switched on, or on and off.

Figure 6:
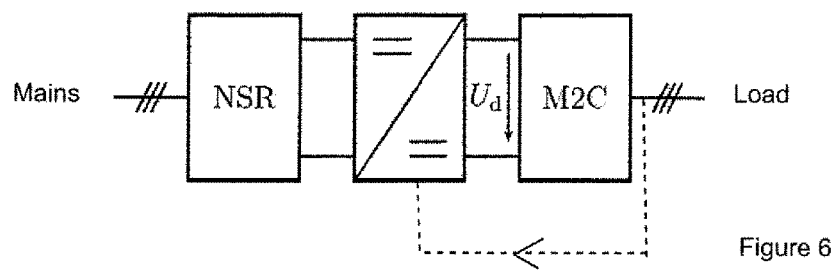

Switching combinations as shown in FIG. 6 are also possible. Here the direct voltage of the mains-side power converter (NSR) is again adapted via a DC/DC converter.

Figure 7:
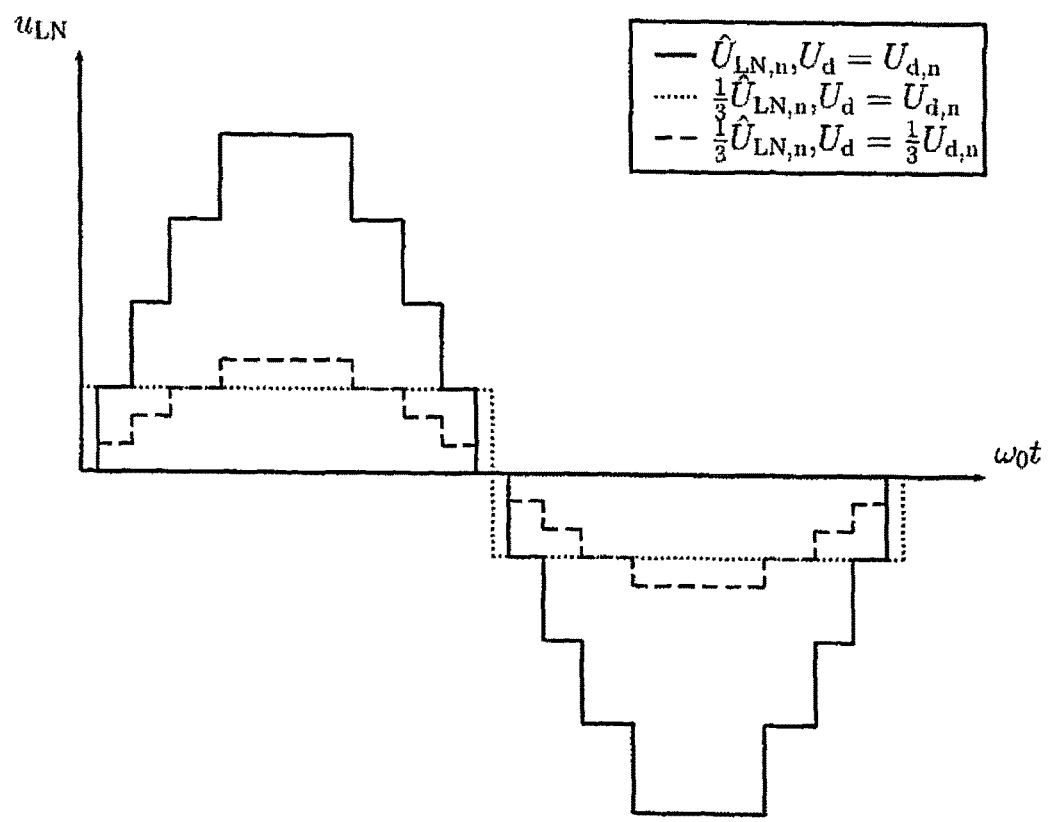

In the case of multilevel converters it is known that the quality of the output voltage reduces as the phase control factor decreases. This effect is illustrated in FIG. 7 (solid line, dashed and dotted lines).

An improvement in the voltage quality can be achieved through different voltage levels of the individual stages, the sub-modules. These different voltage levels of the stages can be achieved through different voltages in the sub-module capacitors. However, this approach is generally unfavorable from a modularity point of view.

A further possibility for the increase of the voltage quality is the matching of the mean sub-module voltage to the voltage $U_d$ by changing the energy stored in the energy storage devices of the sub-modules.

The matching of the mean voltage corresponds to a changed "step height" of the output voltage. In FIG. 7 the resultant output voltage curve for the matched sub-module capacitor voltage is indicated by the dashed line The reduction in the energy fluctuation leads to a minimization of the sub-module capacitor requirement, a simplification of the control and regulation of the M2C, a reduction in overall losses, the avoidance of high modulation of the common mode voltage and/or additional branch current components (circulating currents) and also to an extension of the range of application of the M2C, for example for continuous operation at low frequencies.

An additional advantage is the matching of the capacitor voltage to the variable voltage $U_d$. This enables a higher quality of output voltage with a lower output voltage amplitude with the already available sub-modules. Additional redundancies are possible, but are not necessary.

The invention claimed is:

1. A method for generating a frequency variable AC output voltage from a controllable DC input voltage utilizing a multilevel power converter having a plurality of sub modules, the method comprising:
   switching the sub-modules on and off to generate from the DC input voltage discrete voltage steps approximating a sinusoidal alternating AC output voltage at a M2C controlled output frequency, and
   controlling or regulating the DC input voltage in correlation with the output frequency of the AC output voltage such that the DC input voltage increases with increasing output frequency.

2. The method of claim 1, wherein the sub-modules are switched on and off in stages by switching at least one the sub-modules on and off.

3. The method of claim 2, wherein the at least one sub-module is switched on and off by pulse-width-modulation (PWM).

4. The method of claims 1, wherein the input voltage increases monotonously as a function of the first angular frequency.

5. The method of claim 1, wherein the input voltage increases linearly at least in one interval as a function of the first angular frequency.

6. The method of claim 1, wherein the input voltage increases non-linearly at least in one interval as a function of the first angular frequency.

7. The method of claim 1, further comprising additionally controlling or regulating the input voltage as a function of at least one of a load current, a terminal voltage or load voltage of the M2C, and a torque of a machine controlled with the output voltage.

8. The method of claim 1, further comprising additionally controlling or regulating the input voltage as a function of a modulation of the common-mode voltage of a load.

9. The method of claim 1, further comprising additionally controlling or regulating the input voltage as a function of current resulting from an energy shift between energy storage devices of differing sub-modules within at least one branch of the power converter.

10. An assembly for generating a frequency variable AC output voltage from a controllable DC input voltage, the assembly comprising:
- a modular multilevel power converter (M2C) comprising a DC input side and a plurality of sub-modules connected in series and each forming a branch, with each branch generating a corresponding AC output voltage having a controlled frequency from the DC input voltage, and
- a device producing a controllably variable DC output voltage and being coupled to the DC input side of the power converter, wherein the variable DC output voltage is varied commensurate with the output frequency such that the DC input voltage to the converter increases with increasing output frequency.

11. The assembly of claim 10, wherein the device producing the variable DC output voltage comprises an adjustable transformer and a rectifier.

12. The assembly of claim 10, wherein the device producing the variable DC output voltage comprises a power converter with an intermediate current circuit.

13. The assembly of claim 10, wherein the device producing the variable DC output voltage comprises a mains-side power converter and a DC/DC converter.

14. The assembly of claim 10, wherein the device producing the variable DC output voltage comprises a power converter with an intermediate voltage circuit.

15. The assembly of claim 10, wherein the device producing the variable DC output voltage comprises a converter selected from the group of 2-level converter, 3-level NPC, 3-level flying capacitor voltage source converter, multilevel flying capacitor voltage source converter, and active neutral point clamped multi-level converter (ANPC).

* * * * *